Sept. 19, 1950 C. A. BOSTANY 2,522,701

ILLUMINATED TELEPHONE DIAL AND RINGING CIRCUIT

Filed June 19, 1947

INVENTOR.
Cecil A. Bostany
BY Henry L. Jennings
Attorney

Patented Sept. 19, 1950

2,522,701

UNITED STATES PATENT OFFICE 2,522,701

ILLUMINATED TELEPHONE DIAL AND RINGING CIRCUIT

Cecil A. Bostany, Birmingham, Ala.

Application June 19, 1947, Serial No. 755,624

1 Claim. (Cl. 179—90)

This invention relates to means for illuminating the dials of automatic telephones and has for an object the provision of a simple, easily applied means for illuminating such dials and which shall be energized by raising the receiver from the support on the telephone set, or by the bell of the set ringing for an incoming call.

A more specific object of my invention is to provide a telephone selector mechanism embodying a number dial having openings therein with illuminating means behind the dial and a reflecting finger piece for reflecting light onto the numbers on the dial.

A still further object of my invention is to provide means for illuminating the dials of automatic telephones which shall be adaptable for ready application to existing telephones and which shall include means for energizing the lamps used for illumination both upon an incoming signal and upon lifting the receiver from the telephone set to operate the same.

Apparatus embodying features of my invention is illustrated in the accompanying drawing forming a part of this application, in which.

Figure 1:
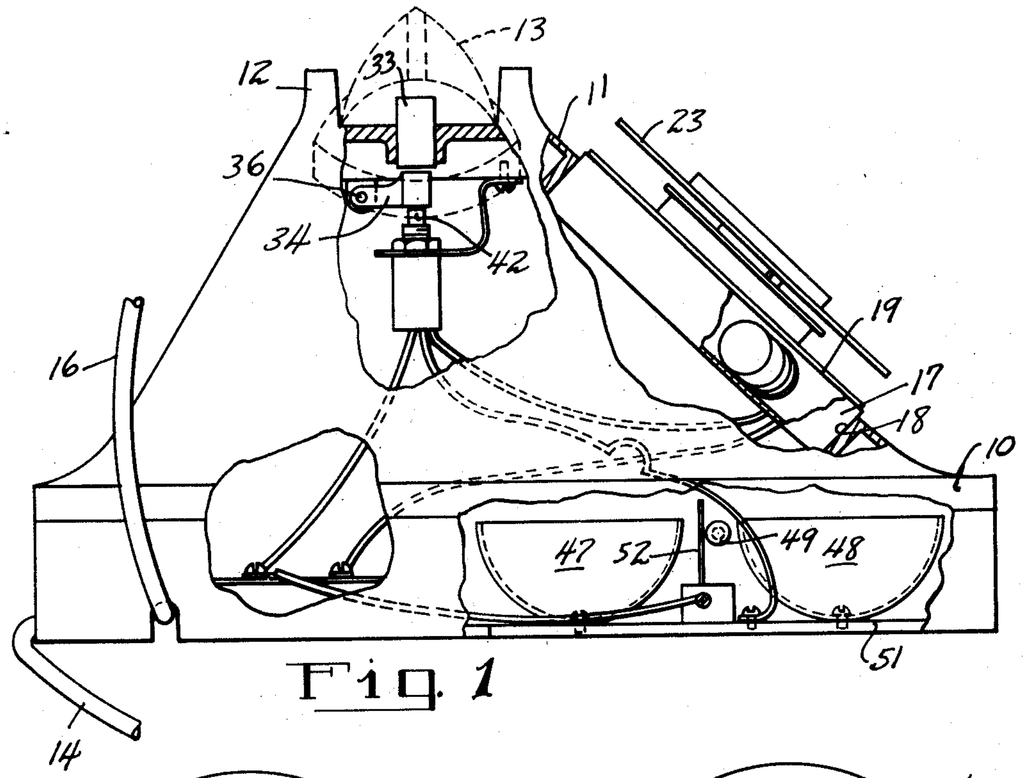
Fig. 1 is a side view of a telephone instrument of the French type with parts broken away and in section.
Figures 2, 3:
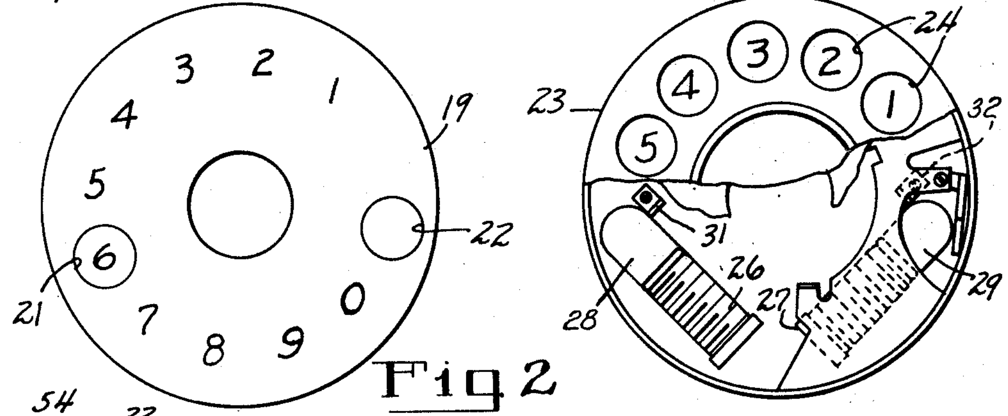
Fig. 2 is a plan view of the number dial removed from the instrument.
Fig. 3 is a plan view of the selector mechanism with parts broken away to show the location of the illuminating means under the number dial.

Referring to the drawing for a better understanding of my invention, I show at Fig. 1 an automatic telephone instrument of the well known French type comprising a base 10, a sloping front wall 11, and a cradle 12 for the transmitter-receiver 13. At 14 is shown a cable which leads to the well known connection box, not shown, and at 16 a second cable which leads to the transmitter-receiver 13.

The selector mechanism comprises a case 17 mounted in an opening 18 in the sloping front wall 11 of the instrument. At 19 is shown the number dial, preferably formed of translucent material with the numerals on the front side. In the drawing the numerals 1 to 9, inclusive, and 0 are shown, but these numerals are illustrative only and any others may be employed. On opposite sides of the dial 19 I provide openings 21 and 22 in the material forming the dial and place in these openings transparent, preferably colored discs through which light can pass. One of these openings may be in the location for the number 6, while the other may be an unnumbered colored disc. At 23 I show the rotary dial, or finger piece of the set which in this case is made of transparent, light reflecting plastic, and is provided with the usual finger holes 24 over the numerals on the dial 19. The remainder of the selector mechanism associated with the telephone set is not shown, as it is well known and forms no part of my invention.

Within the case 17, immediately behind the dial 19, I provide sockets 26 and 27 for receiving two incandescent lamps 28 and 29 which lamps are located directly behind the openings 21 and 22 in the dial 19. I also preferably associate with each of these lamp brackets 31 and 32 which bear against the lamps and prevent them from becoming loose in the sockets.

The cradle 12 is provided with the usual downwardly movable members 33, only one being shown, which bear at their lower ends on a switch arm 34, pivotally mounted at 36 in the instrument.

Figure 4:
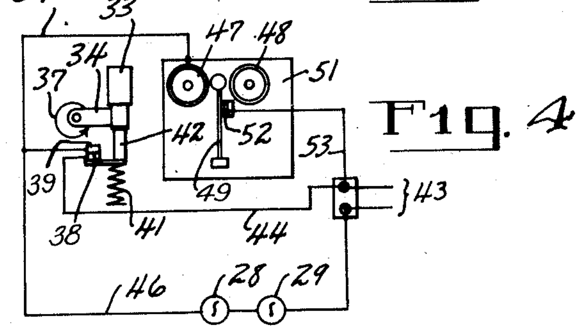
Fig. 4 is a wiring diagram.

The switch arm 34 controls certain switches, not shown, forming parts of the telephone circuit. The switch arm 34 is biased upwardly by means of a spring 37, and when the transmitter-receiver 13 is removed from the cradle 12 it moves upwardly to the position shown in Fig. 4 of the drawing.

Mounted in the instrument, directly beneath the switch arm 34 is an electric switch having contacts 38 and 39, the contact 38 being biased upwardly by means of a spring 41. At 42 is shown a contact arm, associated with the contact 38 and which is disposed immediately below the switch arm 34 so that when the transmitter-receiver 13 is removed from the cradle 12 the switch arm 34 and contact arm 42 move upwardly to close the contacts 38 and 39. At 43 is shown a source of electrical current with one conductor 44 leading to the contact 38 and one conductor 46 leading through the lamps 28 and 29 to the contact 39. It will thus be seen that when the transmitter-receiver 13 is removed from the cradle 12, the contacts 38 and 39 are closed causing the lamps 28 and 29 to be illuminated.

In the base 10 of the telephone instrument are the usual bells 47 and 48 having a vibrating hammer 49 interposed between them which rings for an incoming call on the instrument as is well understood. The bells 47 and 48 and hammer 49 are all mounted on a metal plate 51. In accordance with my invention, I mount a contact member 52 adjacent the vibrating hammer 49 so that, when the hammer is vibrating, a circuit is made from the source of electric current through a conductor 53, the metal plate 51, and a conductor 54 to the conductor 46 and then through the lamps 28 and 29. It will thus be seen that when the hammer 49 is actuated to ring the bells 47 and 48, the lamps 28 and 29 are intermittently illuminated. By providing colored discs in the openings 21 and 22 of the dial 19, this ringing of the bells causes a flickering, colored light to be diffused which will attract the attention of the person as well as the ringing of the bell. This is very important with people who are hard of hearing and who have difficulty in hearing the telephone bell ring.

It will thus be seen from the foregoing that I have provided a telephone instrument with means for illuminating the dial when the telephone is in use and when an incoming call is being received. The transparent, light reflecting, plastic material composing the finger piece or rotary drill 23 reflects the light from the lamps 28 and 29 back onto the numbers on the dial 19 so that they may be readily read in the dark without the necessity of other illumination. I have found that by forming the number dial of translucent material, some of the light from lamps 28 and 29 is diffused thereinto and the numbers on the front side become visible without glare. By forming the rotatable selector dial 23 of light reflecting material, thus to reflect light back onto the face of dial 19, adequate and pleasing illumination of the numbers on the latter dial is obtained.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claim.

What I claim is:

In a dial telephone instrument embodying a receiver and a bell, a stationary number dial of translucent material having openings therein near the periphery thereof, transparent discs in the openings, electric lamps disposed directly beneath the openings, a rotary selector dial mounted over the number dial and formed of transparent light reflecting material for reflecting light downwardly on the number dial, means for energizing the lamps responsive to removing the receiver from the instrument, other means for intermittently energizing the lamps responsive to ringing of the bell by an incoming signal comprising a source of E. M. F., and an electric switch associated with the bell clapper mechanism and disposed to be intermittently closed and opened when the bell is energized.

CECIL A. BOSTANY.

REFERENCES CITED

The following references are of record in the file of this patent:

UNITED STATES PATENTS

| Number | Name | Date |
|---|---|---|
| 1,113,537 | Boze | Oct. 13, 1914 |
| 1,646,996 | Geale | Oct. 25, 1927 |
| 1,747,976 | Hitt | Feb. 18, 1930 |
| 1,794,040 | Stickney | Feb. 24, 1931 |
| 1,864,910 | Jewell | June 28, 1932 |
| 1,966,495 | Fritts | July 17, 1934 |
| 2,061,097 | Fordyce | Nov. 17, 1936 |
| 2,147,944 | Gerrells | Feb. 21, 1939 |
| 2,206,224 | Field | July 2, 1940 |
| 2,222,476 | Caroselli et al. | Nov. 19, 1940 |
| 2,244,609 | Cosgrove | June 3, 1941 |
| 2,278,504 | Wingardner | Apr. 7, 1942 |
| 2,305,378 | Cypser | Dec. 15, 1942 |
| 2,477,918 | Wortman et al. | Aug. 2, 1949 |